R. J. JOHNSON.
BEET TOPPER.
APPLICATION FILED MAY 10, 1919.
1,327,760.
Patented Jan. 13, 1920.
2 SHEETS—SHEET 1.
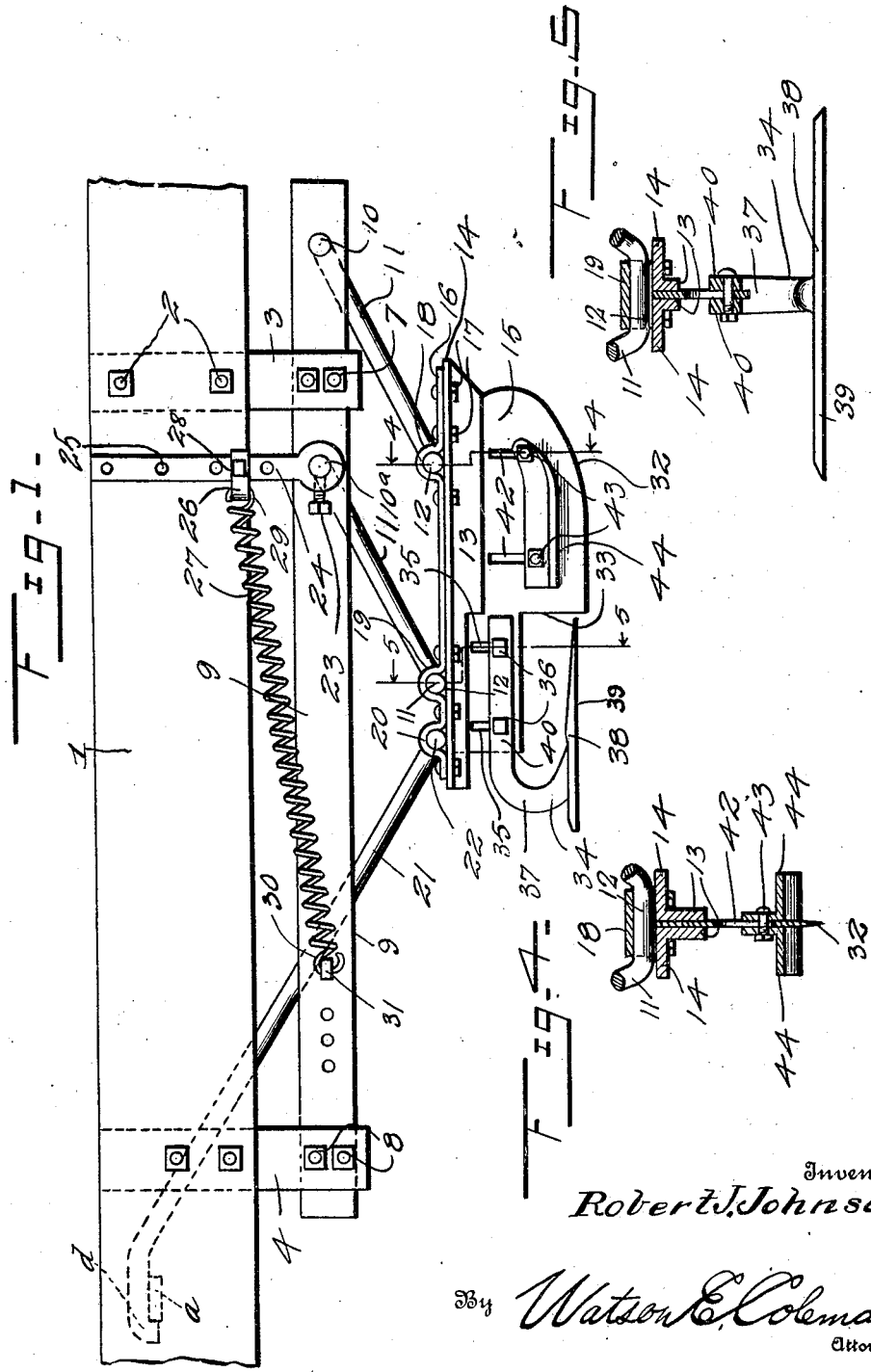
Inventor
Robert J. Johnson.
By Watson E. Coleman
Attorney

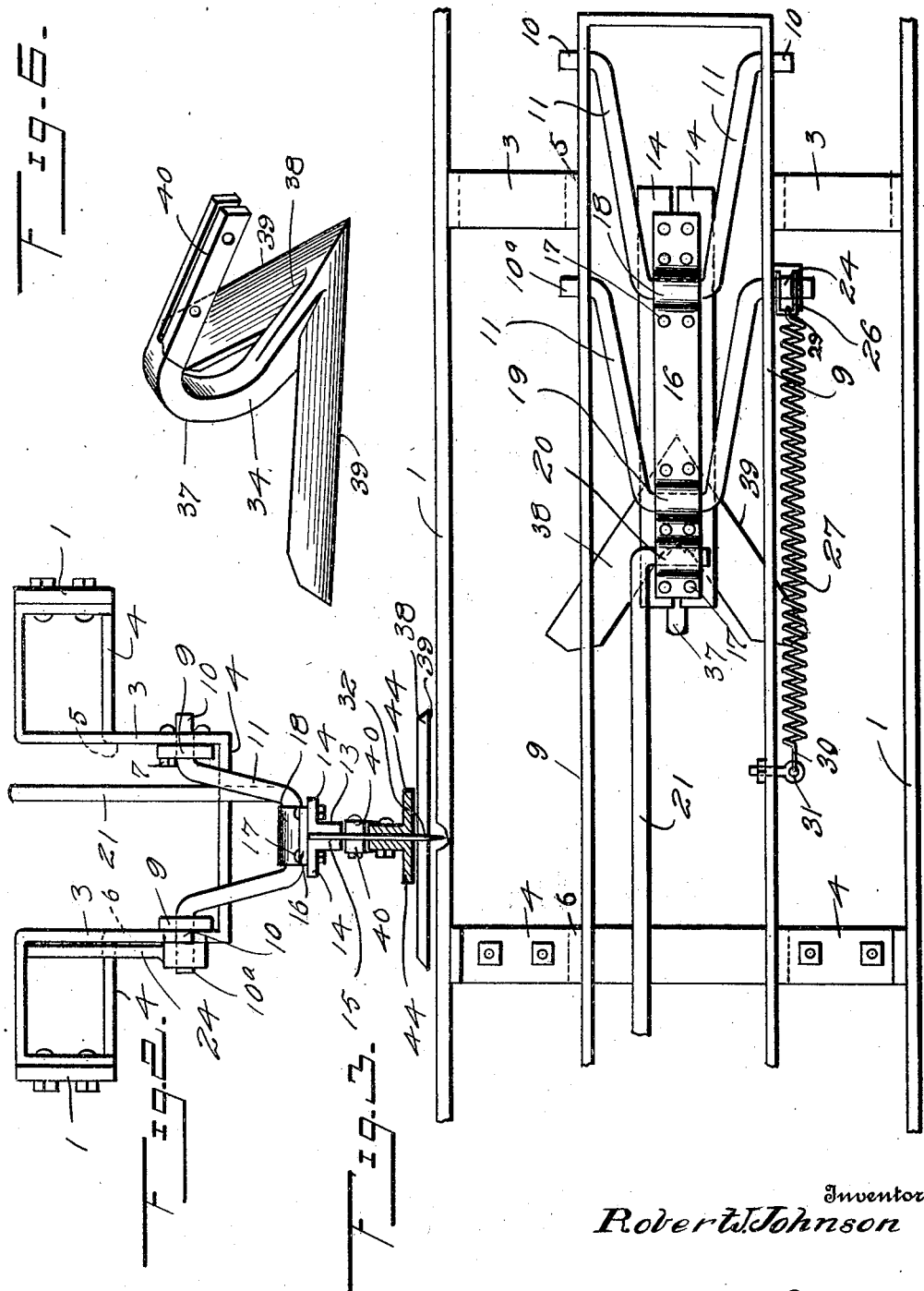

UNITED STATES PATENT OFFICE.

ROBERT J. JOHNSON, OF LOGAN, UTAH.

BEET-TOPPER.

1,327,760.

Specification of Letters Patent.

Patented Jan. 13, 1920.

Application filed May 10, 1919. Serial No. 296,121.

*To all whom it may concern:*

Be it known that I, ROBERT J. JOHNSON, a citizen of the United States, residing at Logan, in the county of Cache and State of Utah, have invented certain new and useful Improvements in Beet-Toppers, of which the following is a specification, reference being had to the accompanying drawings.

This invention relates to an improved beet topper apparatus, and it is the aim of this invention to provide a device of this kind which is particularly adapted for use in connection with plow frames of general design and construction.

The invention further aims to provide a beet topping apparatus including means whereby the apparatus may be easily and quickly raised and lowered relative to the frame of the plow. The beet topping apparatus is swingingly suspended from the sides of the plow frame, there being provision made, whereby the topping apparatus is yieldably urged downwardly, so that a beet top splitting member and a topping member may act upon the beet tops.

A further aim of the invention is to provide beet top splitting means, and beet topping means, and a carrier (which is swingingly suspended from the plow frame) therefor, so that when such means are moved downwardly toward and in coöperation with the beet tops, the tops may be split and severed, the splitting means being arranged vertically, while the topping means are at right angles to the splitting means, and rearwardly disposed.

As a further object of the invention provision is made for adjusting the beet topping means with relation to the carrier, so that while the carrier may be disposed, as a general rule, in a uniform position below the plow frame, the beet topping means may be adjusted slightly with relation to the beet tops, so that the topping of the beets may be regulated without adjusting the carrier. It is obvious that the beet topping means may be removed without removing the splitting means.

A further object of the invention is the provision of means for gaging the depth of the splitting of the beet tops. This is accomplished by means of suitable depth guides adjustably mounted on opposite sides of the splitting means.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a plow frame, showing the beet top splitting and topping means as applied thereto.

Fig. 2 is a front end view of the apparatus.

Fig. 3 is a plan view of the same.

Fig. 4 is a sectional view on line 4—4 of Fig. 1.

Fig. 5 is a vertical sectional view on line 5—5 of Fig. 1.

Fig. 6 is a detail perspective view of the beet topping member.

Referring more especially to the drawings 1 designates the sides of a plow frame, and secured to the sides as by means of bolts or the like 2 are forward and rear hangers 3 and 4. As shown in the drawings the forward hangers are U-shaped, and their outer arms are bolted to the sides of the plow frame, and their inner arms depend downwardly. The rear hangers are angular in cross-section, the outer upstanding arms of which are bolted to the sides of the plow frame, while the inner arms depend downwardly. The inner arms 5 and 6 of the forward and rear hangers have bolted thereto as shown at 7 and 8 longitudinally arranged bars 9, which, as shown in the plan view, are in parallelism. Mounted in suitable bearings of the bars 9 are rock shafts 10 and 10$^a$ having V-shaped depending central portions 11. The lower portions of the V-shaped depending portions are provided with short horizontal parts 12. It is to be noted that when these shafts 10 and 10$^a$, are rocked, their V-shaped depending portions will swing, relative to the bars 9. A carrier 13 is provided, which comprises a pair of parallel arranged angle plates 14. These angle plates have their adjacent vertical flanges spaced, to make provision for a beet top splitting member 15 to be positioned between the flanges. A holding plate 16 is provided, there being bolts 17 passing through the plate 16 and the horizontal flanges of the angle plates, thereby securely connecting the angle plates to the plates 16, whereby the beet top splitting member is clamped securely between the angle plates, as shown clearly in Fig. 2. The plate 16 is elongated, and is provided with a plurality of arched portions 18, 19 and 20. The arched portions 18 and 19 are provided for the reception of the short horizontal portions 12 of the V-shaped depending parts 11 of the shafts 10. These parts 12 so engage in the arched portions 18 and 19 that they may easily rock therein, whereby the carrier may be arranged in different positions. By this connection of the carrier to the depending V-shaped portions of the shafts, it is possible for the carrier to freely move relatively to the V-shaped depending portions of the shafts. A suitable combined thrust and pull rod 21 has its forward right angle end 22 mounted in the arched bearing 20, and it is obvious that by manipulating this rod, the carrier may be moved rearwardly. Secured by means of a setscrew 23 to one end of the shaft 10ª is an upstanding arm 24, which is provided with a plurality of openings 25. A U-shaped strap 26 is employed for connecting a coil spring 27 to the upstanding arm 24, there being a bolt 28, adapted to engage any one of the openings 25 of the arm 24. The coil spring 27 at one end terminates in a hook 29, which engages the U-shaped strap 26. The other end of the coil spring also has a hook 30, engaging an eye 31 on the outer face of one of the bars 9. By means of this coil spring 27, it is to be noted that the carrier is yieldingly urged toward the beet tops, whereby the cutting edge 32 of the beet top splitting member may act upon the beet tops. The beet top splitting member is cut away at its rear portion as shown at 33, in order to make provision for the topping member 34. The portion of the beet topping member adjacent the cut away portion 33 is provided with vertical slots 35, to receive securing bolts 36. The beet topping member or knife comprises a body 37, the curved shank or lug of which terminates in a V-shaped blade 38, the cutting edges 39 of which diverge rearwardly. The blade diverges rearwardly and laterally, so that by means of the diverging edges a shearing action upon the beet tops may be attained, whereby the beet tops may be severed. The forward arm 40 of the body of the beet topping member receives the bolts 36, and it is obvious that by loosening these bolts, the beet topping means or member may be adjusted vertically, with relation to the rear part of the top splitting member. The top splitting member is provided with vertical parallel slots 42, which receive bolts 43, by which the angular depth guides 44 are secured adjustably with relation to the beet top splitting member. The horizontal beet tops of the depth guides act to limit the cutting depth of the beet top splitting member. The topping knife owing to its adjustable connection to the member 16 may be regulated whereby the topping of the beets may be regulated with relation to the splitting of the beet tops.

It is to be distinctly understood that while it is set forth in this specification that the thrust and pull rod 21 may be manually manipulated against the action of the tensioning spring 27 for manually controlling the beet top splitting and topping means, though not necessarily, it is clearly obvious that this thrust and pull rod is designed primarily for preventing the carrier from swinging too far forwardly. Also it is to be distinctly understood that while the carrier is described as being manually controlled, through the medium of the rod 21, but not necessarily, it is further obvious that the carrier works automatically for high and low beets, and does not need to be manipulated by hand. In other words, the carrier rides upon the surface of the soil and owing to the yieldable means, such as the spring 27, the beet top splitting and topping means may accommodate themselves to the irregularities of the growth of the beets, in order to properly split and top the beets. In further words, it is obvious that this improved device can, if so desired, operate both ways, as set forth in this specification. The depth guides act to govern the amount of tops of the beets to be cut, besides governing the depth of the split. The depth guides also prevent cutting too much or too little of the tops of the beets. The carrier rises and lowers vertically on the rocker arms, the carrier remaining in constant parallelism to the frame, as the carrier accommodates itself to the irregularities of the growth of the beets. In other words, the carrier remains substantially in a horizontal position at all times relatively to high and low beets, as well as in parallelism to the frame. In order to utilize the rod 21 to prevent the carrier from moving too far forwardly, the frame 1 is provided with a crosspiece $a$, and the rod 21 has its rear end terminating in a hook $d$. As illustrated in Fig. 1, the hook $d$ is in engagement with the crosspiece $a$, holding the carrier in an intermediate position, preventing the carrier from moving too far forwardly beyond this particular position. It will be seen that as the carrier is traveling over the surface of the soil, the rear end of the rod 21 will slide relatively to the crosspiece $a$, allowing the carrier to automatically rise and lower according to the irregularities in the growth of the beets. It is obvious that the carrier can rise and lower automatically, whereby it can accommodate itself to the irregularities in the growth of the beets, the depth guides acting automatically to govern the depth of the split and the amount of the tops of the beets to be cut or severed.

The invention having been set forth, what is claimed as new and useful is:

1. The combination with a frame, of a carrier, means for mounting the carrier on the frame whereby it may move toward the beet tops, said carrier comprising angle plates, means for connecting the angle plates, whereby their vertical flanges may be spaced, a beet top splitting member in said space, and provided with slots, depth guides carried by the splitting member, means passing through said slots for connecting the depth guides to the splitting member, and a beet topping member carried by the rear of the splitting member and at right angles thereto.

2. In an apparatus as set forth, the combination with a carrier, of a supporting frame therefor including means whereby the carrier may be swingingly suspended from the frame, said carrier comprising angle plates, means for securing the angle plates together and pivotally connected to the swinging suspended means, a beet top splitting element secured between the angle plates and provided with vertical slots at the rear, and means passing through the slots for adjustably connecting the beet topping member to the rear of the splitting element.

3. In an apparatus as set forth, the combination with a carrier, of a supporting frame therefor including means whereby the carrier may be swingingly suspended from the frame, said carrier comprising angle plates, means for securing the angle plates together and pivotally connected to the swinging suspended means, a beet top splitting element secured between the angle plates and provided with vertical slots at the rear, and means passing through the slots for adjustably connecting the beet topping member to the rear of the splitting element, depth guides adjustably mounted on the beet top splitting element to govern the depth of the split, and means for yieldingly urging the carrier toward the beet tops, whereby the splitting element and the topping member may perform their functions.

4. The combination with a frame, of a carrier, rock shafts having depending parts pivotally connected to the carrier, yieldable means connecting between the rock shafts and the frame and coöperating between such parts, whereby the carrier automatically rises and lowers, whereby the carrier may accommodate itself to the irregularities of the growth of the beets, and beet top splitting and topping means mounted on the carrier, and means for preventing the carrier from moving too far forwardly.

5. The combination with a frame, of a carrier, rock shafts having depending parts pivotally connected to the carrier, yieldable means connecting between the rock shafts and the frame and coöperating between such parts, whereby the carrier automatically rises and lowers, whereby the carrier may accommodate itself to the irregularities of the growth of the beets, beet top splitting and topping means mounted on the carrier, and means for holding the carrier in different adjusted positions, said last named means while holding the carrier in such positions, adapted to prevent the carrier from moving too far forwardly.

6. The combination with a frame, of a carrier, rock shafts having depending parts pivotally connected to the carrier, yieldable means connecting between the rock shafts and the frame and coöperating between such parts, whereby the carrier automatically rises and lowers, whereby the carrier may accommodate itself to the irregularities of the growth of the beets, beet top splitting means on the carrier, beet topping means adjustably mounted on the carrier to the rear of the splitting means and being adjustably connected to the carrier, the topping member proper being at right angles to the splitting member proper, and means to prevent the carrier from moving too far forwardly.

7. The combination with a frame, of a carrier, rock shafts having depending parts pivotally connected to the carrier, yieldable means connecting between the rock shafts, and the frame and coöperating between such parts, whereby the carrier automatically rises and lowers, whereby the carrier may accommodate itself to the irregularities of the growth of the beets, beet top splitting means on the carrier, beet topping means adjustably mounted on the carrier to the rear of the splitting means and being adjustably connected to the carrier, the topping member proper being at right angles to the splitting member proper, means for holding the carrier in different adjusted positions, and being adapted, while holding the carrier in such positions, to prevent the carrier from moving too far forwardly, and depth guides to govern the amount of the tops of beets to be cut and govern the depth of the split and preventing cutting too much or too little of the tops from the beet.

8. The combination with a frame, of a carrier, rock shafts having depending parts pivotally connected to the carrier, yieldable means connecting between the rock shafts and the frame and coöperating between such parts, whereby the carrier automatically rises and lowers, whereby the carrier may accommodate itself to the irregularities of the growth of the beets, and beet top splitting and topping means mounted on the carrier, and means for preventing the carrier from moving too far forwardly, and depth guides mounted on the carrier adjustably and designed to govern the amount of tops of the beets to be cut, besides governing the depth of the split and also preventing cutting too much or too little of the tops from the beets.

9. The combination with a frame, of a carrier, a pair of drop shafts rockably mounted in bearings of the frame and adapted to oscillate in parallelism, means for pivotally mounting the carrier on the lower parts of the drop shafts, beet topping and splitting means adjustably mounted on the carrier, and a thrust and pull rod pivotally connected to the carrier and having a detachable connection with said frame for preventing the carrier from moving too far forwardly.

10. The combination with a frame, of a carrier, a pair of drop shafts rockably mounted in bearings on the frame and adapted to swing in parallelism, means for pivotally mounting the carrier on the lower parts of the drop shafts, whereby the carrier may move at all times in parallelism with the frame, beet topping and splitting means mounted on the carrier, tensioning means connecting between one of the shafts and the frame to urge the carrier forwardly and downwardly, means pivotally connected to the carrier and having detachable connection with the frame, to prevent the carrier from moving too far forwardly and downwardly under the influence of the tensioning means.

11. The combination with a frame, of a carrier, means swingably suspended from the frame and supporting the carrier, whereby it may swing at all times in parallelism with the frame, tensioning means connecting between said swingably mounted means and the frame, thereby urging the carrier forwardly and downwardly, beet topping and splitting means mounted on the carrier, and a thrust and pull rod pivotally connected to the carrier and having a detachable connection with the frame, to prevent the carrier from moving too far forwardly and downwardly under the influence of the tensioning means.

12. The combination with a frame, of a carrier, means swingingly mounted on bearings on the frame and being pivotally connected to the carrier whereby the carrier may move at all times in parallelism with the frame, said swingingly mounted means carrying an arm, a spring connecting between the arm and the frame for urging the carrier forwardly and downwardly, beet topping and splitting means on the carrier, a thrust and pull rod pivotally connected to the carrier and having a hook engaging a part of the frame to prevent the carrier from moving too far forwardly and downwardly under the influence of the spring.

13. The combination with a frame, of a carrier comprising angle plates, means for connecting the angle plates, whereby their vertical flanges may be spaced, a beet top splitting member in said space, means for swingingly mounting said carrier on the frame, and a thrust and pull rod pivotally connected to the carrier and having detachable connection with the frame to prevent the carrier from moving too far forwardly and downwardly.

14. The combination with a frame, of a carrier comprising angle plates, means for connecting the plates, whereby their vertical flanges may be spaced, a beet top splitting member in said space and provided with adjustable depth guides, means for swingingly mounting the carrier on the frame, tensioning means connecting the frame and the swingingly mounted means for urging the carrier forwardly and downwardly, and a device pivotally connected to the carrier and provided with a detachable connection with the frame for preventing the carrier from moving too far forwardly and downwardly under the influence of the tensioning means.

In testimony whereof I hereunto affix my signature in the presence of two witnesses.

ROBERT J. JOHNSON.

Witnesses:
WM. MORTIMER,
H. B. PARKS.